United States Patent [19]
Morse et al.

[11] Patent Number: 5,110,649
[45] Date of Patent: May 5, 1992

[54] SEPARABLE FASTENERS FOR ATTACHMENT TO OTHER OBJECTS

[75] Inventors: Andrew P. Morse, Manchester; George A. Provost, Litchfield, both of N.H.

[73] Assignee: Velcro Industries, B.V., Netherlands

[21] Appl. No.: 548,385

[22] Filed: Jul. 3, 1990

[51] Int. Cl.⁵ ............................................. A44B 21/00
[52] U.S. Cl. .................................. 428/100; 428/120; 428/192; 428/198; 428/247; 428/304.4; 24/444
[58] Field of Search ............... 428/100, 120, 192, 198, 428/247, 304.4, 99; 24/306, 444

[56] References Cited

U.S. PATENT DOCUMENTS

| | | | |
|---|---|---|---|
| 4,673,542 | 6/1987 | Wigner et al. | 264/275 |
| 4,726,975 | 2/1988 | Hatch | 24/444 |

Primary Examiner—Alexander S. Thomas
Attorney, Agent, or Firm—Hayes, Soloway, Hennessey & Hage

[57] ABSTRACT

A hook and loop type fastener element is provided with a foam backing which seals against a mold wall surrounding a trough which protects the element fastening surface from contact with the foam. A metal strip is positioned behind the foam and is preferably held by an open-mesh scrim secured to the foam and metal strip by hot melt adhesive strips.

10 Claims, 3 Drawing Sheets

SEPARABLE FASTENERS FOR ATTACHMENT TO OTHER OBJECTS

BACKGROUND OF THE INVENTION

1. Field of the Invention

This invention relates to an improved separable fasteners, particularly those of the hook and loop type, for attachment to other objects, particularly such objects as polyurethane foam seat cushions for automobiles, furniture and the like, wherein one portion of a separable fastener is incorporated into the foam object during the molding process for subsequent attachment to another object carrying the mating portion of the separable fastener. The improved fastener of the invention is easier to produce, store, transport, and use in the mold-in process and provides improved results both during and after the mold-in process.

2. Description of the Prior Art

Hook and loop type separable fasteners such as those sold by the assignee of this application under the trademark Velcro ® are well-known and are used to join two members detachably to each other. This type of fastener has two components. Each has a flexible backing material having one component of the fastening system on the surface thereof. One surface is typically comprised of resilient hooks while the other is comprised of loops, and when the two surfaces are pressed together they interlock to form a releasable engagement.

Separable fasteners have in recent years been used in the manufacture of automobile seats in the attachment of the upholstered seat cover to the polyurethane foam bun. One portion of the separable fastener is incorporated onto the surface of the polyurethane foam bun during the foam molding process. The mating portion of the separable fastener is attached to the seat cover to provide releasable attachment to the foam bun. The separable fastener assembly used in the mold typically comprises the hooked portion of a separable fastener. It usually has a backing tape carrying resilient hooks, the backing tape being attached to a substrate. The outer surface of the substrate may carry projections to become incorporated into the foam to provide stable attachment of the separable fastener assembly to the foam article. In some assemblies, a magnetic shim is often placed between the backing tape and the substrate to facilitate placement in the trough of the mold cavity, which is equipped with magnets. A protective layer, usually in the form of a thin plastic film, may be placed over the resilient hooks to prevent incursion of foam into the hooks during the molding process, since significant contamination of the hooks would affect their ability to engage with the mating portion of the fastener attached to the seat cover. The assemblies are usually subjected to ultrasonic flattening at pre-determined lengths in order to mark the assembly for cutting, thus providing finished terminal ends.

One disadvantage of the separable fastener assemblies of the type disclosed in U.S. Pat. No. 4,673,542 is that the thin plastic film layer used to cover the hooks must be removed after the mold-in process, thus requiring an additional and somewhat painstaking step in the manufacture of the foam seat bun, and also requiring an additional component in the manufacture of the assembly which must be attached to the separable fastener tape with an adhesive. In addition, an adhesive-backed tape is usually affixed to the film layer to assist in its removal.

Other prior-art assemblies, (including those disclosed in U.S. Pat. Nos. 4,726,975, 4,563,380 and 4,693,921) also employ a thin layer of film to prevent the incursion of foam into the projections of the separable fastener portion during mold-in. While French Patent 2,423,666 (Aplix) and U.S. Pat. No. 4,710,414 mention use of a foam to assist in sealing, the French patent never achieved commercial success and the U.S. Pat. No. ('414) still required use of a separable sealing film layer. The recently issued patent to Ogawa U.S. Pat. No. 4,842,916 (Jun. 27, 1989) disclosed the use of nonwoven fabric or foam strips on the front edges of a fastener strip to seal against entry of a foaming liquid.

Other problems with the aforementioned prior art assemblies have been present. One disadvantage is that the most commonly used substrate materials, such as the loop-backed tapes, are relatively stiff, have a limited degree of flexibility, and have virtually no elasticity. Such assemblies have been shown to present problems of distortion after manufacture and during storage and shipment, resulting in a product which is wavy, curled, or stiffened ("beam" effect).

SUMMARY OF THE INVENTION

The present invention overcomes the difficulties of the prior art by providing a product in which no protective film covering the hooks is required, while still being attached to the mold by a magnetic shim.

The fastener assembly of the present invention comprises a separable fastener tape including a fastener strip carrying hooked elements on one face thereof, a thin layer of a small pore foam attached to the other face of the backing, and a layer of open-mesh fabric attached to the outer face of the foam layer. The fastener strip is narrower than the mold trough and the foam layer is wider than the hooked fastener strip, and the open-mesh fabric is preferably wider in dimension than the foam. A ferromagnetic metal shim is sandwiched between the foam and open-mesh layers to hold the assembly i position in the mold due to the attraction of the mold-mounted magnets positioned in the bottom of the trough. The layers are assembled using a suitable (e.g. hot-melt) adhesive.

In order to more fully understand the invention, reference should be had to the following specification and the accompanying drawings wherein.

FIGS. 1 through 4 show the improved separable fastener assembly of the present invention, comprising the separable fastener strip 10 carrying hook elements 12 on one fact thereof. A thin foam layer 14 is adhesively attached to the other face of the fastener strip 10 and extends beyond the edges of the fastener strip 10. An open-mesh fabric layer 16 forms the last layer of the assembly and is preferably considerably wider than the thin foam layer 14.

Figure 1:
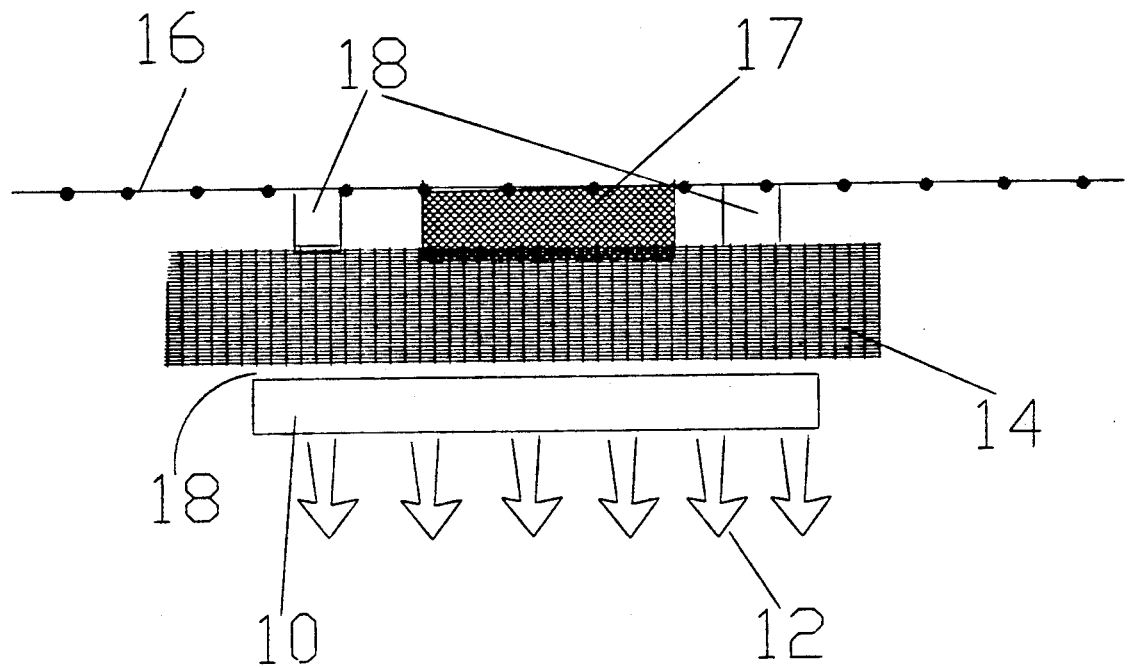
FIG. 1 is a cross-sectional view of the assembly of the present invention taken along a plane perpendicular to the longitudinal axis thereof.
Figure 2:
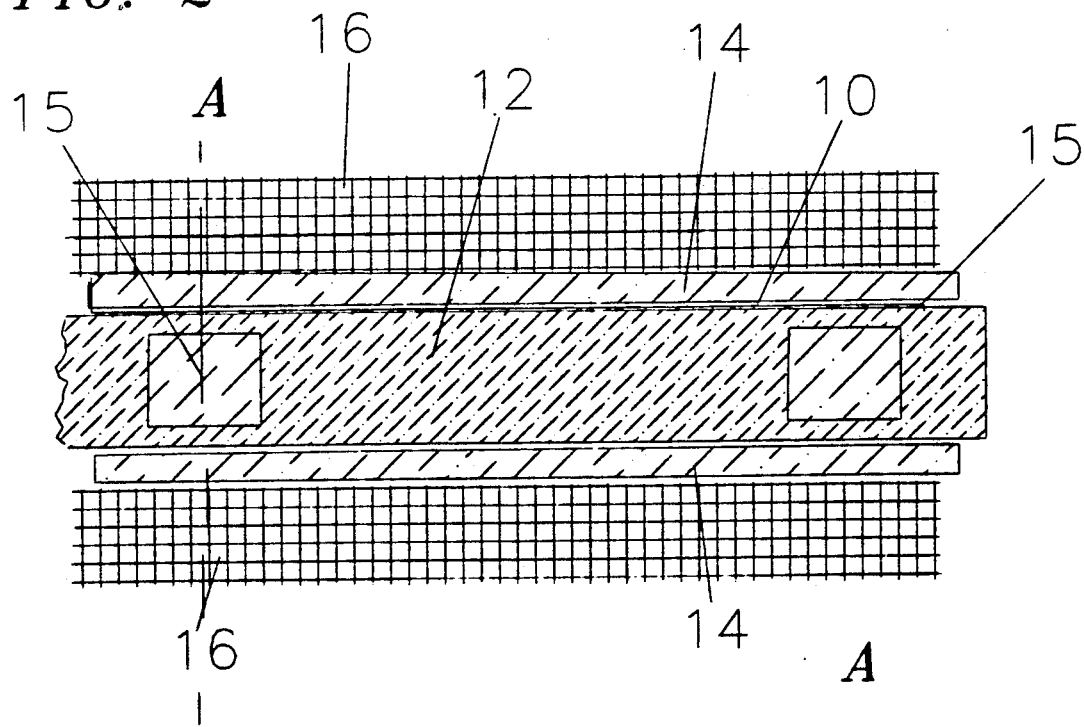
FIG. 2 is a top plan view of the fastener assembly of the present invention.
Figure 3:
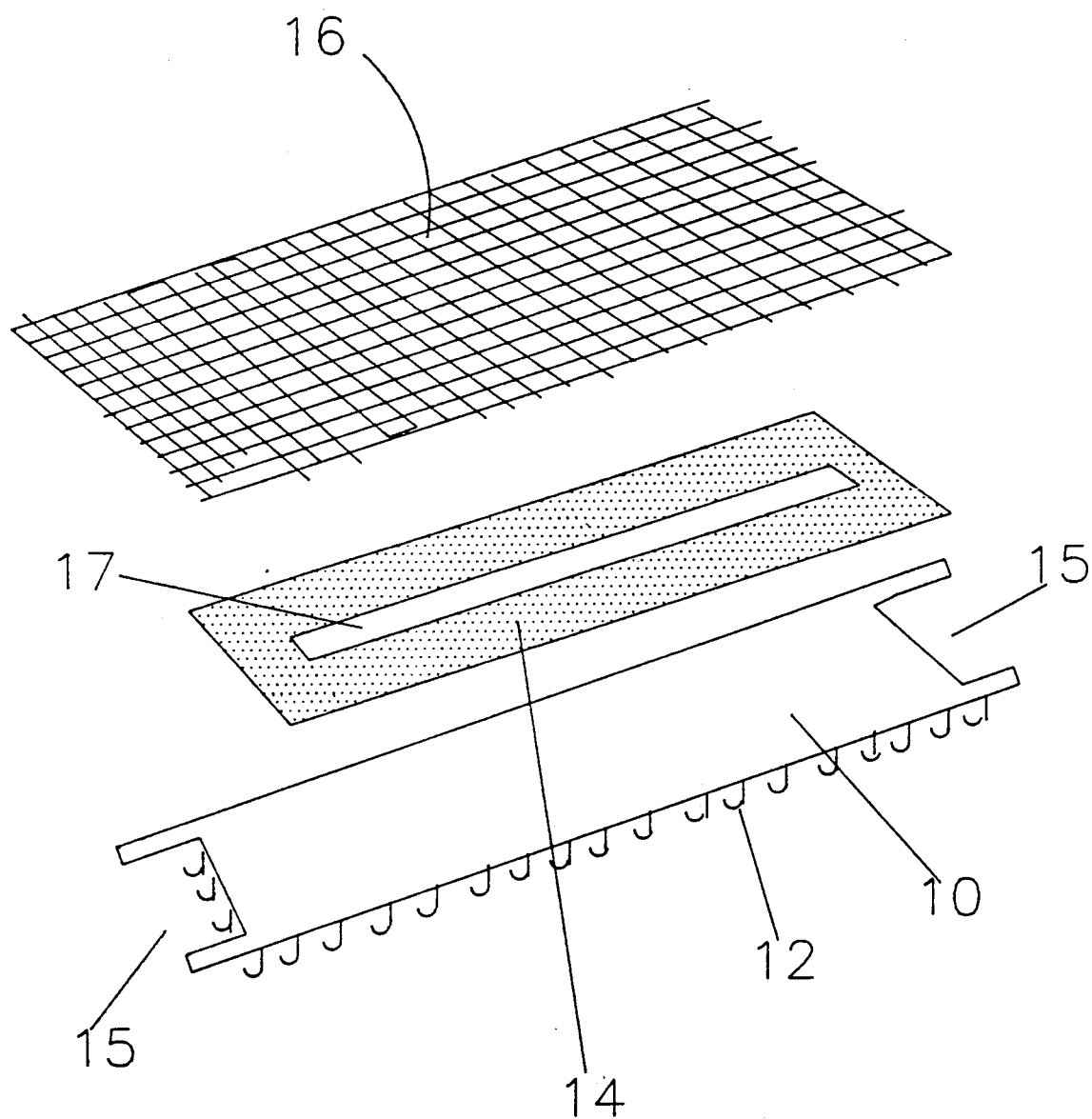
FIG. 3 is an exploded view of the assembly of the present invention.
Figure 4:
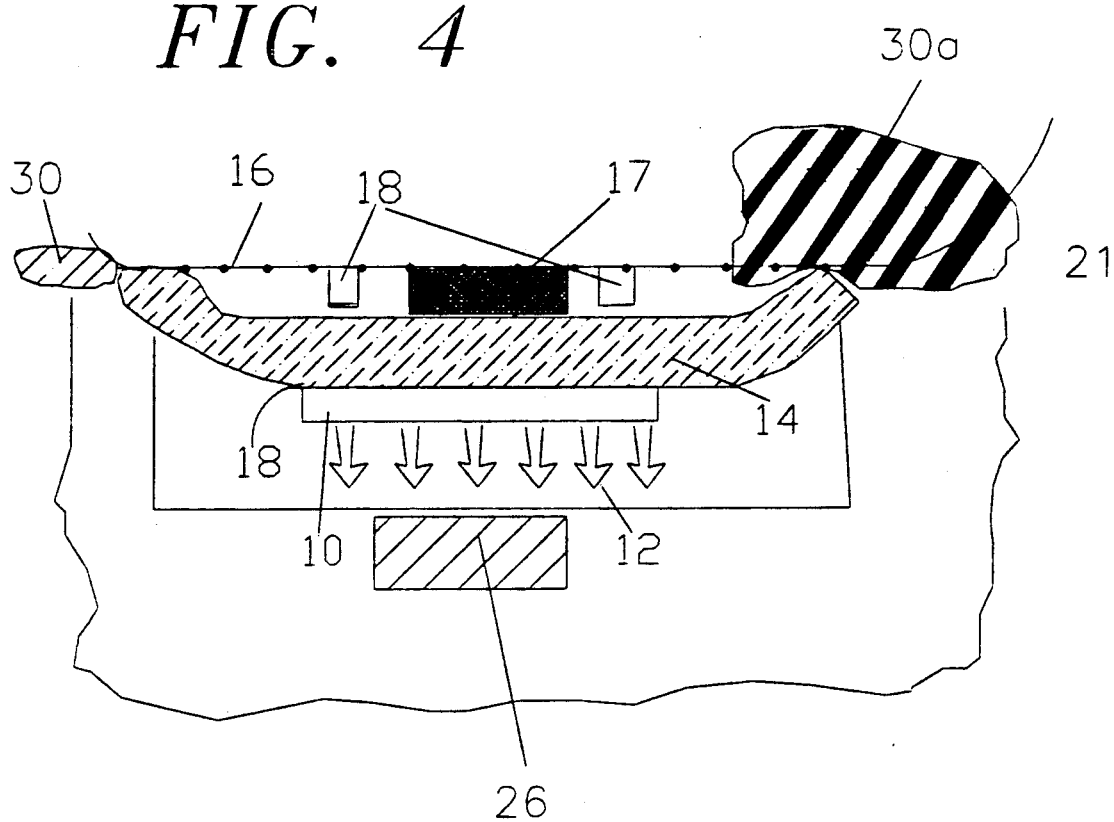
FIG. 4 is a sectional view of a trough of a mold cavity with a separable fastener assembly spanning the trough.

As illustrated in FIGS. 2 and 3, "windows" or cut-away areas 15 of the fastener strip 10 are die-cut at predetermined locations where the assemblies may be cut, as for example along lines A, to predetermined lengths. The thin foam layer 14 is exposed at the cut-away areas 15. FIGS. 3 and 4 show the metal shim 17 which is positioned, in the preferred embodiment, between the thin foam layer 14 and the open-mesh fabric layer 16. The layers of the assembly are attached together with a suitable (e.g. hot-melt) adhesive. FIG. 4 shows hot-melt adhesive beads 18 of the preferred embodiment which are applied to the metal shim 17 and thin foam layer 14 to affix the open-mesh layer 16 to the assembly and hold shim 17 in place.

A preferred form of the invention is schematically illustrated in FIGS. 1-4 wherein the fastener strip 10 is a molded plastic element of the type described in Fischer U.S. Pat. No. 4,794,028 preferably formed of nylon or some other thermoplastic material which can be molded to include the final desired hook shape 12. Such a fastener strip 10 has considerable transverse stiffness even though it is sufficiently flexible in its longitudinal direction to follow the contour of a seat cushion. This transverse stiffness is sufficient to transmit, to a foam layer 14, a foam compression force resulting from the attraction of the metal layer 17 to mold-mounted magnets 26 (See FIG. 4). Thus, as the metal strip 17 is firmly held by magnetic inserts 26, as shown in FIG. 4, the strip 10 compresses the edges of the foam layer 14 adjacent the cavities 24 in which the fastener strip is positioned. This foam compression is sufficient to prevent leakage of the foaming polymer 30 between the foam layer 10 and the mold surface 21 adjacent the edges of the mold recess 24.

FIG. 4 shows the assembly in position in the mold trough 24 during the molding process. Once the liquid urethane 30 is introduced into the mold cavity 22, the open-mesh layer 16 permits the foaming liquid to penetrate between the open-mesh layer 16 and the mold wall 21. As the foaming process proceeds, the foam 30a, created between the mold wall 21 and the overhanging open-mesh layer 16, pushes the open-mesh layer 16 upwardly into the forming mass of foam 30a and securely anchors the mesh 16 in the finished foam cushion. Thus, the open-mesh layer 16 becomes deeply incorporated into the foam upon curing of the polymer. The thin foam layer 14 tends to partially absorb some of the pre-polymer. However, the open celled foam layer 14 has sufficiently small cell openings that it re-directs the mass of the pre-polymer liquid away from the hooks 12, thus acting as a gasket to prevent substantial penetration of the pre-polymer as it cross-links into its polymerized product. As a result, incursion of foam into the hooks 12 is avoided without the necessity of using a plastic film layer to cover the hooks as in the prior art.

In assembling the preferred form of the invention, the fastener strip 10 is adhesively bonded to the foam layer 14 by a hot-melt adhesive layer 18 and then the metal strip 17 is held to the back of the foam layer 10 by being sandwiched between the open-mesh layer 16 and the foam layer 14, the mesh layer 16 being adhesively bonded to both the foam 10 and metal layer 17. Thus, in a preferred form, there is no direct bond between the metal layer 17 and the foam layer 14.

The novel combination of elements, wherein the relatively inextensible strip fastener 10 and the metal strip layer 17 are separated by a compressible foam 14, which extends beyond the edges of the fastener layer 10 and is pushed against the mold recess 24 edges, provides a product which can be manufactured on mass production machinery and readily placed securely and positively in the mold prior to the molding process. After the molding step is completed, no further treatment of the product is necessary to provide a completed foamed seat cushion.

After the improved separable fastener assembly is positioned in the trough 24 of a mold unit, the foam-forming components 30 are introduced in liquid form into the mold so as to permit the components to flow into and around the open-mesh fabric layer 16 of the assembly while undergoing polymerization and permitted free venting of excess gases formed by the polymerization process. As mentioned, the open-mesh fabric layer 16 has been attached to the assembly longitudinally preferably along middle portions by adhesive strips 18 of the thin foam layer 10. Accordingly, during the molding process, the outer edges of the open-mesh layer tend to bend away from the rest of the assembly, allowing the open-mesh layer to become even more deeply embedded into the foam.

The thin foam layer acts as a gasket to prevent intrusion of the foaming polyurethane foam into the hooks during mold-in. As the liquid urethane pre-polymer enters the mold, it gets partially absorbed and re-directed by the foam, presumably because Polymerization of the pre-polymer increases viscosity of the mixture and will mostly take place before the liquid gets a chance to travel beyond and through the fine holes in the small pore thin foam layer and intrude into the hooks.

In order to provide a structure having the above characteristics, it is preferred that the strip fastener 10 be relatively inextensible and have to give sufficient transverse rigidity to compress the edge of the Foam firmly against the edge of the tranch. The foam 14 is preferably at least 1/16 inch thick and preferably is an open-cell foam to permit some penetration by the foaming polymer material into the foam layer. However, the cell density be not less than 10 cells per square centimeter and preferably greater than 20 cells/cm$^2$ so that the foaming liquid 30 will have great difficulty penetrating completely through the foam layer 14 prior to the completion of the polymerization step. The flexible open-mesh fabric 16 is preferably on the order of about four picks per inch and is formed of a material (such as polyester) which readily bonds to the foaming urethane. Due to the open-mesh of the fabric 16, when the foam 30 penetrates through the mesh and commences to expand it surrounds and lifts the lateral unattached edges of the mesh 16 and imbeds them deeply into the foam, (see FIG. 4). The central portion of the mesh remains adhesively secured to the back of the foam layer and metallic shim.

During the manufacture and shipping of this product to the present invention, various elements are subjected to elevated temperatures and different humidities. The use of a hot melt adhesive 18 and the positioning of the foam layer 14 between the metal layer 17 and the fastener layer 10 permits differential expansion for the metal layer 17 and the strip fastener layer 10 without creating distortion of either layer by force transmitted to the other layer. The relatively open-mesh of the fabric layer 16 is not capable of transmitting any distortion force to any of the other elements or the combination. Thus, in the preferred embodiment, the fabric layer 16 additionally isolates shim layer 17 from fastener strip 10.

An improved method of manufacturing the terminal ends of the separable fastener assembly uses "windows" 15 (see FIG. 2) or openings of a predetermined size which are die cut into the hooked tape. The windows 15 are placed at the terminal ends of the assembly to provide an exposed foam layer 14. Due to the attraction by the end mold magnets 26 the metal shim 17 presses down on the terminal foam-layer 14 ends to form a tight seal to guard against incursion of pre-polymer 30 into the terminal ends of the hooked strip 10.

As mentioned above, the foam layer 14 can stretch and the open-mesh fabric 16 can bend freely; neither layer is stiff, an changes in temperature or humidity will not cause distortion of the hooked tape 10 relative to the metal shim 17, because the thin foam layer 14 is compliant to the differential expansion and contraction of the hooked tape 10. Thus, the need for shipment of the touch fastener assembly to the user in a temperature-controlled environment is eliminated.

Due to the nature of the foam 14 and open-mesh layer 16 the assembly has greater flexibility which renders it suitable for conforming to contour molds. In addition, the resultant flexibility of the seat bun after installation of the present mold-in assembly is greatly improved as compared to the stiffness of the prior-art assemblies which alters the comfort level ("H-point") of the seat bun.

The materials used in the preferred embodiment of the assembly comprise a foam layer 14 of a polyurethane, including polyether or polyester type, of a thickness of about 1/32". The open-mesh 16 can be any fiber with a texture or count of from $20 \times 12$ to $4 \times 4$ textile, but $4 \times 4$ leno textile is preferable because of the open areas which facilitate incursion of foaming liquid 30 during the mold-in process. A preferred fiber is polyester such as Dacron sold by E. I. Dupont.

Figure 5:
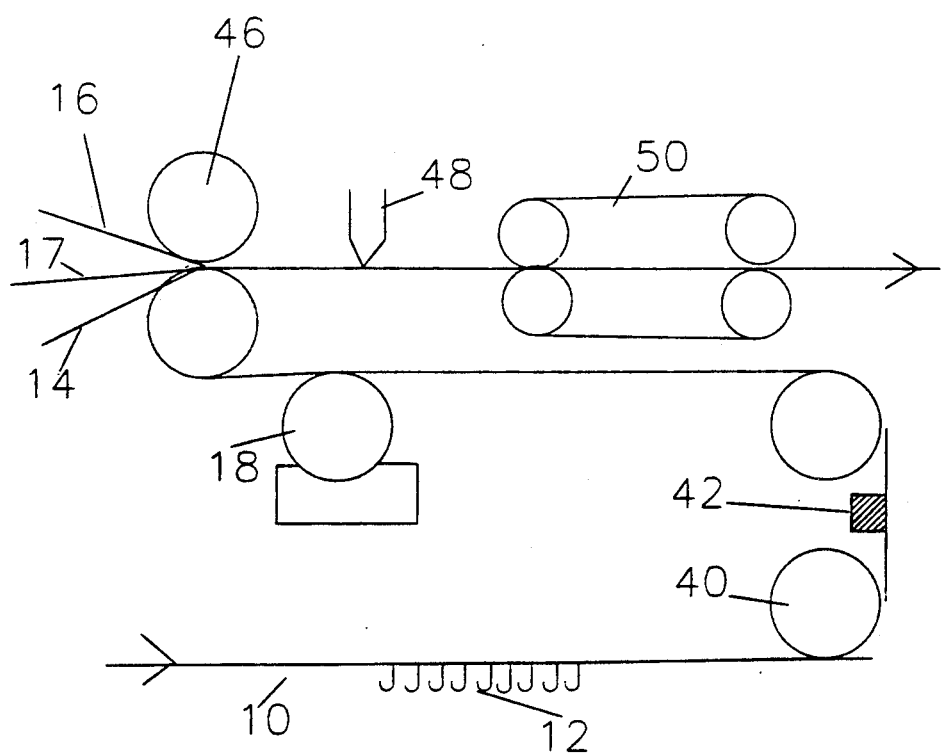
FIG. 5 is a schematic diagram of a preferred apparatus for manufacturing the assembly of the present invention.

The preferred embodiment of the apparatus for manufacturing the separable fastener assembly of the present invention is shown in FIG. 5 wherein separate supplies of the various layers are shown schematically. A layer of fastener strip 10 is fed (with hooks 12 facing down) to a die-cut mechanism schematically shown at 40 and then to a cut area removal station 42 thence to a hot-melt adhesive application roll 44 where a layer of hot-melt adhesive 18 is applied to the back side of the fastener strip 10. Simultaneously, a foam layer 14 and metal 16 scrim layer 16 are fed between rolls 46 where fastener layer 10 and foam layer 14 are adhesively bonded and metal layer 17 and scrim layer 16 are held in position for the application of three strips of hot-melt adhesive 18 to the top surface of the assembly by applicator 48. Thereafter the total assembly is drawn between cooled belts 50 to set all the hot-melt adhesive layers. As the finished assembly leaves the belts 50, it is preferably cut to length adjacent the windows 15.

We claim:

1. An improved fastener assembly for attachment to other objects, and adapted to be embodied in a foamed cushion by being held in a trough in a mold wall during foaming of the cushion, said trough having a predetermined width, said fastener assembly comprising
   a fastener strip having an outer surface comprising one-half of a touch fastening system, said strip having a predetermined width less than the width of the trough;
   a thin foam layer having a front surface attached to the inner surface of said fastener strip, said foam layer having a width substantially greater than the predetermined width of said fastening strip so as to extend a substantial distance beyond each edge of said fastening strip and overlap the edges of the trough;
   an open-mesh fabric layer attached to a back surface of said thin foam layer; and
   a metal shim held on to said thin foam layer, said metal shim being adapted to be held in the foam mold by mold-mounted magnets in the bottom of the trough.

2. The improvement of claim 1, wherein an open-mesh fabric layer is attached to said thin foam layer along points intermediate the width of said fastener strip, the outer edges of said open-mesh fabric being free to move away from the foam layer during foaming of a cushion.

3. The improvement of claim 2, wherein the open-mesh fabric layer extends beyond the outer edges of said thin foam layer, so that the foaming liquid can exist between a mold wall and the edges of the open-mesh to move the mesh into the body of the foaming liquid.

4. The assembly of claim 3, wherein said open-mesh fabric layer is attached to said thin foam layer and said metal strip along points intermediate the width of said fastener strip.

5. The assembly of claim 4, wherein said layers are attached to one another with a hot-melt adhesive.

6. The improvement of claim 2, wherein a portion of said fastener strip is cut away at predetermined locations along the length of the strip to expose a portion of said thin foam layer.

7. The assembly of claim 2, wherein the metal shim is held adjacent said thin foam layer by being bonded to said open-mesh fabric layer.

8. The fastener assembly of claim 1, wherein the strip fastener has sufficient transverse stiffness to transmit a foam compression force to the foam layer resulting from the attraction of the metal layer to the mold mounted magnets, said foam compression being sufficient to prevent leakage of said foaming polymer between the foam layer and the mold surface adjacent the edges of the mold recess.

9. The fastener assembly of claim 8 wherein the metal layer and strip fastener are relatively inextensible, whereby when said metal layer is held by said magnets, the holding force of the magnets is transmitted to the edges of the strip fastener along its entire length to compress the edge portions of the foam layer against the mold surface to prevent penetration to the operative surface of the strip fastener by the foaming liquid.

10. The fastener assembly of claim 1, wherein said foam layer is an open cell foam having more than 10 cells per square centimeter.

* * * * *